(12) United States Patent
Hanada et al.

(10) Patent No.: US 10,791,117 B2
(45) Date of Patent: Sep. 29, 2020

(54) DATA TRANSMISSION METHOD, DISPLAY SYSTEM, AND SERVER

(71) Applicant: CASIO COMPUTER CO., LTD., Tokyo (JP)

(72) Inventors: Takeshi Hanada, Tachikawa (JP); Toyokazu Nishio, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 293 days.

(21) Appl. No.: 15/899,540

(22) Filed: Feb. 20, 2018

(65) Prior Publication Data

US 2018/0248874 A1     Aug. 30, 2018

(30) Foreign Application Priority Data

Feb. 27, 2017   (JP) ................................ 2017-035325

(51) Int. Cl.
*H04L 29/06* (2006.01)
*H04W 4/80* (2018.01)
*H04W 12/06* (2009.01)

(52) U.S. Cl.
CPC ........ *H04L 63/0876* (2013.01); *H04L 63/083* (2013.01); *H04W 4/80* (2018.02); *H04W 12/06* (2013.01)

(58) Field of Classification Search
CPC .................... H04L 63/0876; H04L 63/083
USPC .......................................................... 726/7
See application file for complete search history.

(56) References Cited

U.S. PATENT DOCUMENTS

2014/0199972 A1*  7/2014  Ejima ................... H04W 12/06
                                                                                 455/411
2016/0314474 A1   10/2016  Schibi et al.

FOREIGN PATENT DOCUMENTS

| JP | 2003-123033 A |   | 4/2003  |
|----|---------------|---|---------|
| JP | 2003-281302 A |   | 10/2003 |
| JP | 2005-234981 A | * | 9/2005  |
| JP | 2008-071327 A |   | 3/2008  |
| JP | 2008-234537 A |   | 10/2008 |

(Continued)

OTHER PUBLICATIONS

Notice of Reasons for Refusal dated Nov. 19, 2019 received in Japanese Patent Application No. JP 2017-035325 together with an English language translation.

*Primary Examiner* — Longbit Chai
(74) *Attorney, Agent, or Firm* — Scully Scott Murphy & Presser

(57) ABSTRACT

An embodiment of a data transmission method is executed by a server that includes a memory that stores first unique number data presenting a first unique number and second unique number data presenting a second unique number, in association with each other, and includes receiving a first unique number data presenting a first unique number from a first electronic device in the first unique number reception step. Whether the first unique number presented by the first unique number data received in the first unique number reception step matches the first unique number presented by the first unique number data stored in the memory is determined in the determination step. The second unique number data stored in association with the first unique number data stored in the memory is transmitted to the first electronic device when determined in the determination step that they match.

7 Claims, 16 Drawing Sheets

(56) References Cited

FOREIGN PATENT DOCUMENTS

| | | | |
|---|---|---|---|
| JP | 2011-197929 | A | 10/2011 |
| JP | 2015-162694 | A | 9/2015 |

\* cited by examiner

FIG. 3

| MODULE ID | PRODUCT SERIAL S |
|---|---|
| PL203120123 | GS0001 |
| PL203120124 | GS0002 |
| PL203120125 | GS0003 |
| PL203120126 | GS0004 |
| PL203120127 | GS0005 |
| ... | ... |

FIG. 12

| MODULE ID | SERIAL NUMBER S | FIRST PARING DATE | NUMBER OF YEARS OF WARRANTY |
|---|---|---|---|
| PL203120123 | GS0001 | 1/17/2017 | 3 years |
| PL203120124 | GS0002 | | 3 years |
| PL203120125 | GS0003 | 3/2/2017 | 3 years |
| PL203120126 | GS0004 | | 3 years |
| PL203120127 | GS0005 | | 3 years |
| ... | ... | ... | ... |

… (1)

DATA TRANSMISSION METHOD, DISPLAY SYSTEM, AND SERVER

CROSS-REFERENCE TO RELATED APPLICATION

This application claims the benefit of Japanese Patent Application No. 2017-035325, filed on Feb. 27, 2017, the entire disclosure of which is incorporated by reference herein.

FIELD

This application relates generally to a data transmission method, a display system, and a server.

BACKGROUND

For example, Unexamined Japanese Patent Application Kokai Publication No. 2008-071327 discloses a system enabling efficient search for instruction manuals and/or operation methods of a product on the Internet and issuance of a product warranty. When the user wishes to search for an instruction manual, the user enters a product name on a terminal connected to this system via the Internet or the like, whereby an instruction manual is displayed on the display screen of the terminal. Moreover, as the user enters a product name and a manufacturing number on the terminal, a product warranty is displayed on the display screen of the terminal.

On the other hand, products such as electronic devices are counterfeited including their product name and unique numbers such as the product number indicated on the exterior. Therefore, it is difficult for the user to determine whether the product is genuine or counterfeit only by the product name and/or the product number indicated on the exterior. Also with the system disclosed in the above patent literature, if the same product name and product number as a genuine product are given to a counterfeit, a product warranty is displayed on the terminal even though the product is not a genuine one. Therefore, the system of the above patent literature cannot be used for determining whether a product is genuine or counterfeit.

SUMMARY

A data transmission method, a display system, and a server are disclosed.

According to one embodiment, a mode of the data transmission method is a data transmission method that is executed by a server that comprises a memory that stores first unique number data presenting a first unique number and second unique number data presenting a second unique number, in association with each other, and the data transmission method includes:

receiving first unique number data presenting a first unique number from a first electronic device in a first unique number reception step;

determining whether the first unique number presented by the first unique number data received in the first unique number reception step matches the first unique number presented by the first unique number data stored in the memory in a determination step; and transmitting to the first electronic device the second unique number data stored in association with the first unique number data stored in the memory when determined in the determination step that the first unique number presented by the first unique number data received in the first unique number reception step matches the first unique number presented by the first unique number data stored in the memory in a second unique number transmission step.

Moreover, another embodiment is a display system that comprises a first electronic device and a server, wherein the server comprises:

a memory that stores first unique number data presenting a first unique number and second unique number data presenting a second unique number, in association with each other;

a communicator that receives first unique number data presenting a first unique number from the first electronic device; and a processor, the processor determines whether the first unique number presented by the first unique number data received by the communicator matches the first unique number presented by the first unique number data stored in the memory, and causes the communicator to transmit to the first electronic device the second unique number data stored in association with the first unique number stored in the memory when determined that the first unique number presented by the first unique number data received by the communicator matches the first unique number presented by the first unique number data stored in the memory, and the first electronic device generates display data that include the second unique number data transmitted by the server in basic data that are prepared in advance and displays the display data on a display.

Moreover, an embodiment of the server comprises:

a memory that stores first unique number data presenting a first unique number and second unique number data presenting a second unique number, in association with each other;

a communicator that receives first unique number data presenting a first unique number from the first electronic device; and a processor, wherein the processor determines whether the first unique number presented by the first unique number data received by the communicator matches the first unique number presented by the first unique number data stored in the memory, and causes the communicator transmit to the first electronic device the second unique number data stored in association with the first unique number data stored in the memory when determined that the first unique number presented by the first unique number data received by the communicator matches the first unique number presented by the first unique number data stored in the memory.

BRIEF DESCRIPTION OF THE DRAWINGS

A more complete understanding of this application can be obtained when the following detailed description is considered in conjunction with the following drawings, in which:

FIG. 3 is a chart showing the module ID table according to Embodiment 1 of the present disclosure;

FIG. 12 is a chart showing the module ID table according to Embodiment 2 of the present disclosure;

DETAILED DESCRIPTION

The certificate display system according to embodiments will be described below with reference to the drawings.

Embodiment 1

Figure 1:
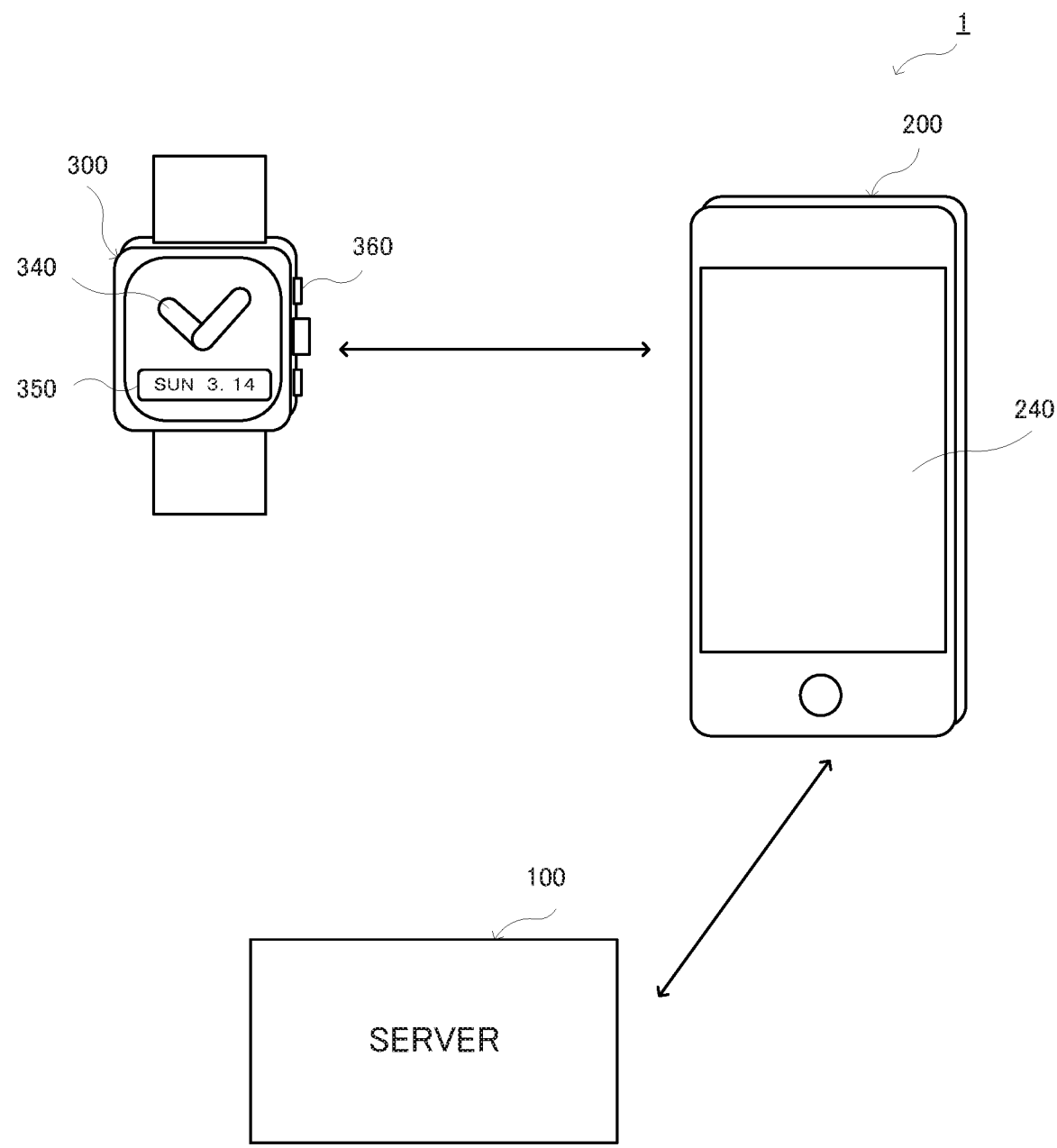
FIG. 1 is an illustration showing the certificate display system according to Embodiment 1 of the present disclosure.

A certificate display system 1 according to Embodiment 1 comprises, as shown in FIG. 1, a server 100 and a communication terminal 200. The server 100 and the communication terminal 200 (a first electronic device) are configured to be mutually communicable via an Internet line. Moreover, the communication terminal 200 and an electronic watch 300 (a second electronic device) are configured to be mutually communicable via a wireless line. The electronic watch 300 preretains data of a module ID (a first unique number) that is a unique number indicated on a substrate (module) on which electronic parts are mounted, and transmits the module ID to the communication terminal 200. The server 100 receives the module ID via the communication terminal 200 and when the module ID matches a module ID preregistered in the server 100, transmits to the communication terminal 200 data presenting a product serial S (a second unique number) corresponding to the module ID. Then, the communication terminal 200 display on a display 240 an image showing a certificate including the product serial S received from the server 100. The user of the electronic watch 300 views the image displayed on the communication terminal 200 and the product serial S engraved on the back cover of the electronic watch 300 and confirms that they are the same, whereby the user can confirm that the electronic watch is a genuine product.

Figure 2:
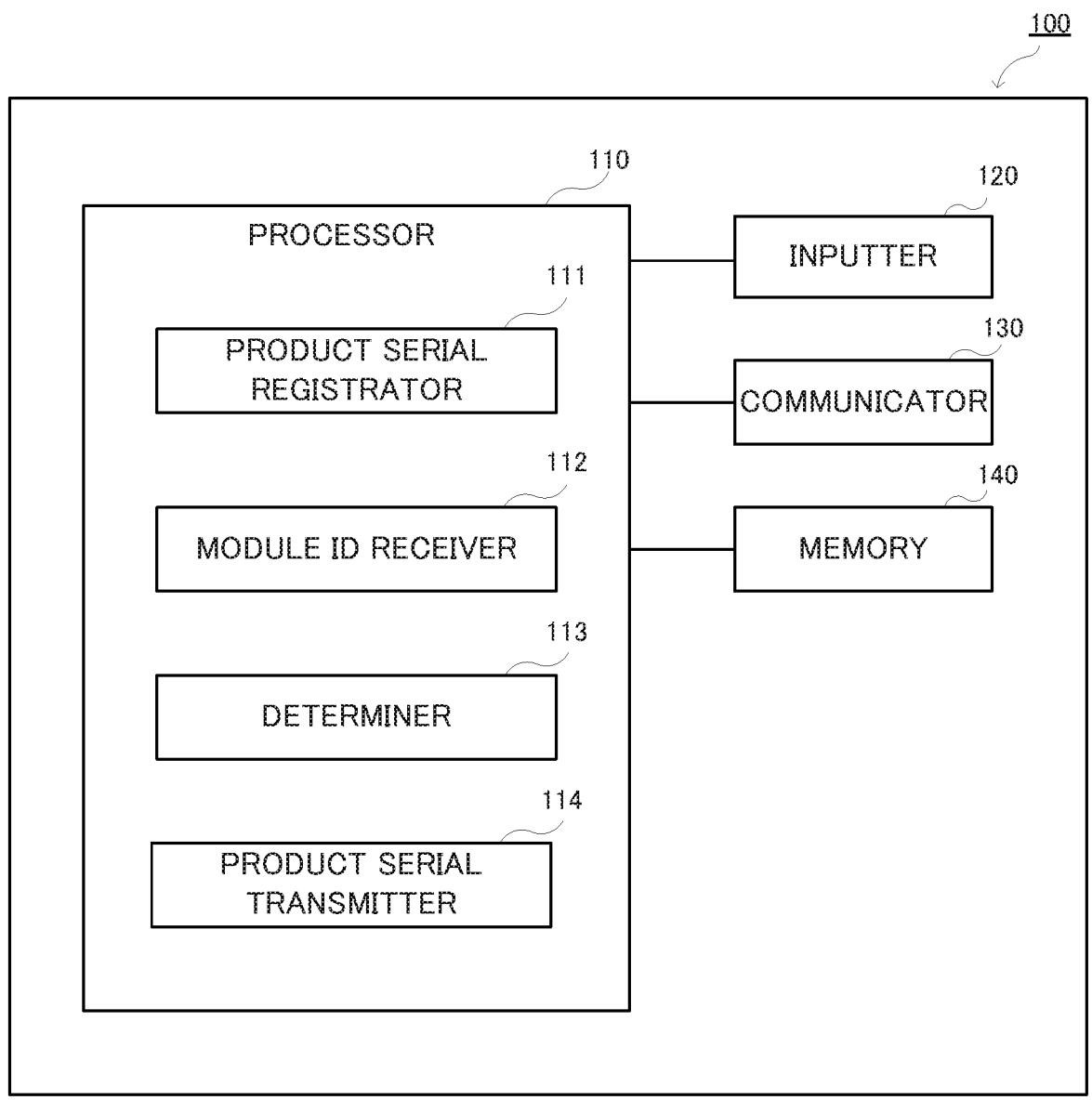
FIG. 2 is a block diagram showing the configuration of the server according to Embodiment 1 of the present disclosure.

The server 100 comprises, as shown in FIG. 2, a processor 110, an inputter 120, a communicator 130, and a memory 140.

The processor 110 comprises a central processing unit (CPU), a read only memory (ROM), a random access memory (RAM), and the like. With the CPU reading programs stored in the ROM and executing them on the RAM, the processor 110 functions as a product serial registrator (unique number registrator) 111, a module ID receiver 112, a determiner 113, and a product serial transmitter (transmitter) 114.

The product serial registrator 111 acquires a module ID and a product serial S of the electronic watch 300 via the inputter 120, and associates and registers (stores) the acquired module ID and product serial S in a module ID table stored in the memory 140 and shown in FIG. 3. The module ID is a number comprising a manufacturing line, a manufacturing date, a serial number, and the like and used for identifying the module installed in the electronic watch 300. The module ID is stored in a memory 320 of the electronic watch 300 described later. The product serial S is a number comprising a product model name and a serial number and given for identifying the assembled electronic watch 300. The product serial S is engraved on the back cover of the electronic watch 300. The product serial registrator 111 acquires the module ID and the product serial S from the electronic watch 300 and registers them in the module ID table before the electronic watch 300 is shipped as a product.

The module ID receiver 112 receives the module ID of the electronic watch 300 acquired by the communication terminal 200 via the communicator 130.

The determiner 113 determines whether the module ID received by the module ID receiver 112 is registered in the module ID table.

If the determiner 113 determines that the module ID is registered in the module ID table, the product serial transmitter 114 transmits data presenting a product serial S corresponding to the module ID received by the module ID receiver 112 to the communication terminal 200 via the communicator 130. On the other hand, if the determiner 113 determines that the module ID is not registered in the module ID table, the product serial transmitter 114 transmits data presenting no registration of the module ID to the communication terminal 200.

The inputter 120 has a module ID and a product serial S of the electronic watch 300 entered and outputs the module ID and the product serial S to the product serial registrator 111. For example, the inputter 120 acquires a module ID via a communication device communicably connected to the electronic watch 300. Moreover, the inputter 120 acquires data presenting a product serial S by, for example, converting a captured image of the product serial S engraved on the back cover to character data by optical character recognition (OCR) or issuing a barcode at the same time as engraving a product serial S on the back cover and scanning the barcode.

The communicator 130 mutually communicates with the communication terminal 200 via an Internet line. The communicator 130 receives the module ID transmitted by the communication terminal 200. Moreover, the communicator 130 transmits data presenting the product serial S and the like to the communication terminal 200.

The memory 140 comprises a nonvolatile memory such as a hard disc drive and stores the module ID table.

Figure 4:
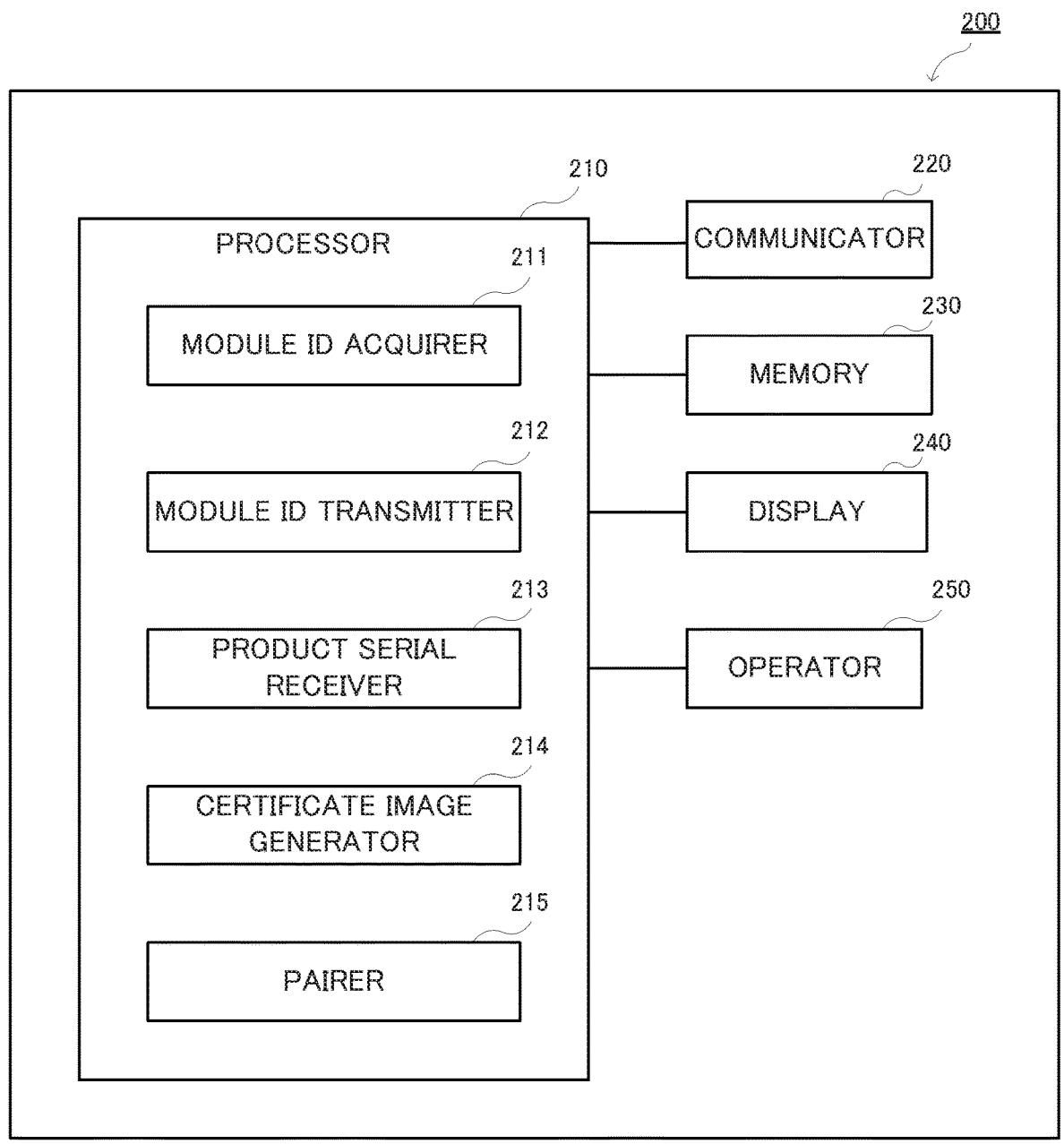
FIG. 4 is a block diagram showing the configuration of the communication terminal according to Embodiment 1 of the present disclosure.

The communication terminal 200 comprises, as shown in FIG. 4, a processor 210, a communicator 220, a memory 230, a display 240, and an operator 250. The communication terminal 200 communicates with the server 100 via an Internet line and mutually communicates with the electronic watch 300 via a wireless line. The communication terminal 200 comprises, for example, a smartphone, a tablet personal computer (PC), or the like.

The processor 210 comprises a CPU, a ROM, and a RAM. With the CPU reading programs stored in the ROM and executing them on the RAM, the processor 210 functions as a module ID acquirer 211, a module ID transmitter 212, a product serial receiver 213, a certificate image generator 214, and a pairer 215.

The module ID acquirer 211 acquires data presenting the module ID transmitted by the electronic watch 300 via the communicator 220 when the electronic watch 300 and the communication terminal 200 are paired by the pairer 215 described later. The module ID acquirer 211 saves the module ID in the memory 230.

The module ID transmitter 212 transmits data presenting the module ID acquired by the module ID acquirer 211 to the server 100 via the communicator 220.

The product serial receiver 213 acquires data presenting the product serial S and data presenting no registration of the module ID that are transmitted by the server 100 via the communicator 220.

If the product serial receiver 213 acquires data presenting the product serial S, the certificate image generator 214 combines the product serial S with certificate image data (basic data) presaved in the memory 230 to generate a certificate image including the product serial S (display data), and displays the image on the display 240. On the other hand, if the product serial receiver 213 acquires data presenting no registration of the module ID, the certificate image generator 214 generates an image including information presenting no registration of the module ID and displays the image on the display 240.

The pairer 215 executes a pairing procedure for connection setting between the communication terminal 200 and the electronic watch 300 by a personal identification number (PIN) and user operation entered into the operator 250.

The communicator 220 comprises a wireless communication module of a wireless local area network (LAN), Bluetooth (registered trademark), or the like. For example, the communicator 220 mutually communicates with the server 100 via an Internet access point by a wireless LAN. Moreover, the communicator 220 mutually communicates with the electronic watch 300 by Bluetooth.

The memory 230 stores the module ID acquired by the module ID acquirer 211, the product serial S acquired by the product serial receiver 213, and the certificate image generated by the certificate image generator 214. Moreover, the memory 230 presaves certificate image data.

The display 240 displays images and comprises a liquid crystal display (LCD) or the like. The display 240 displays a certificate image including the product serial S and an image including information presenting no registration of the module ID that are generated by the certificate image generator 214.

The operator 250 receives an order to start the certificate display procedure, PIN data, and the like based on user input. Here, the operator 250 and the display 240 constitute a touch panel display.

Figure 5:
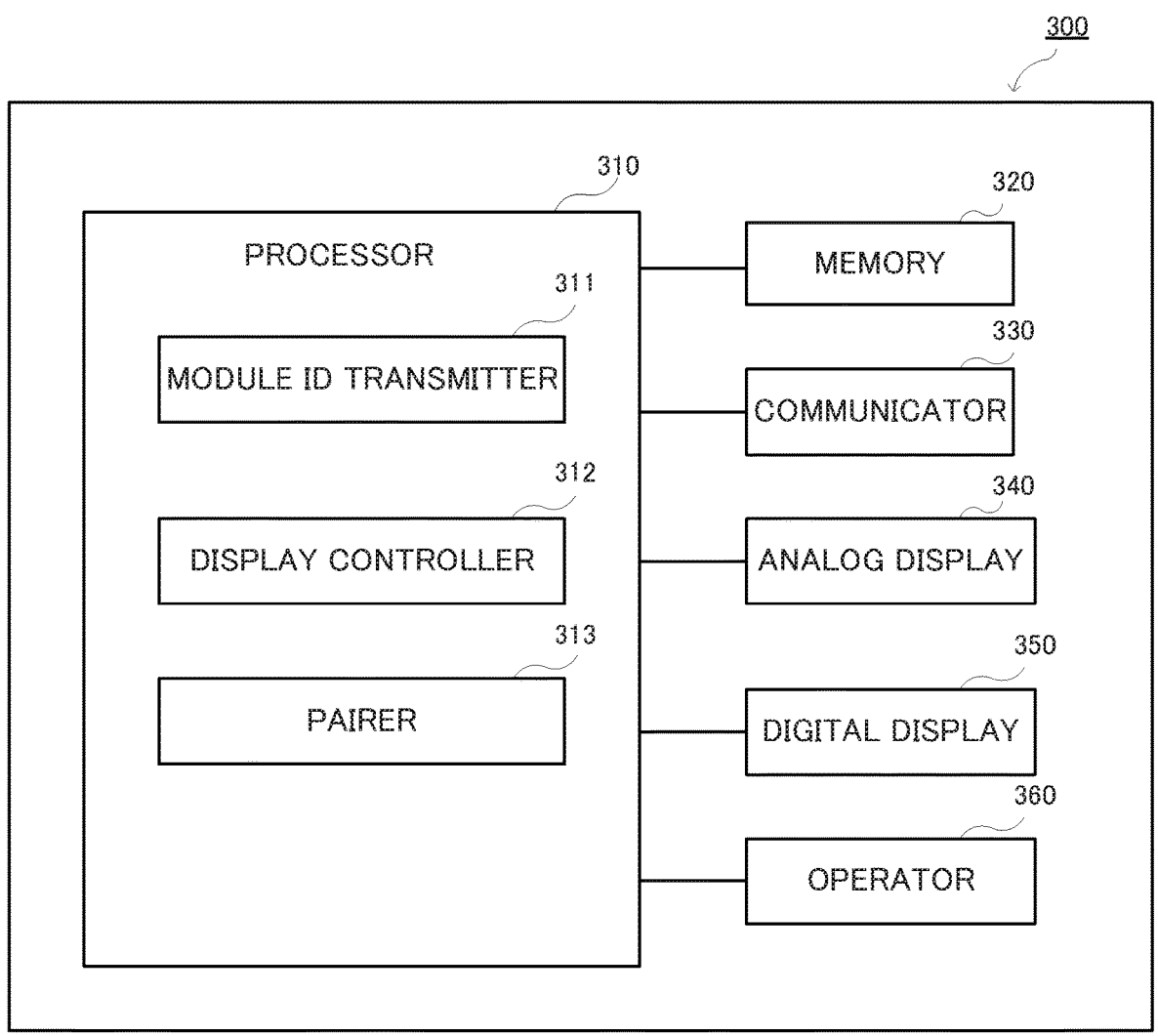
FIG. 5 is a block diagram showing the configuration of the electronic watch according to Embodiment 1 of the present disclosure.

The electronic watch 300 displays the date/time and comprises, as shown in FIG. 5, a processor 310, a memory 320, a communicator 330, an analog display 340, a digital display 350, and an operator 360. A product serial S is engraved on the back cover of the electronic watch 300. The processor 310 and the memory 320 constitute the module of the electronic watch 300.

The processor 310 comprises a CPU, a ROM, and a RAM. With the CPU reading programs stored in the ROM and executing them on the RAM, the processor 310 functions as a module ID transmitter 311, a display controller 312, and a pairer 313.

If determined that the communication terminal 200 and the electronic watch 300 are paired, the module ID transmitter 311 transmits the module ID stored in the memory 320 to the communication terminal 200 via the communicator 330.

The display controller 312 controls the analog display 340 and the digital display 350. The display controller 312 displays the current time on the analog display 340 and the digital display 350 based on time information acquired via the communicator 330.

The pairer 313 transmits an advertising signal via the communicator 330. Receiving a response signal presenting input of a PIN from the communication terminal 200, the pairer 313 executes the pairing procedure on the communication terminal 200 and the electronic watch 300.

The memory 320 comprises a nonvolatile memory such as a flash memory and stores a unique module ID.

The communicator 330 comprises a wireless communication module of Bluetooth or the like. The communicator 330 mutually communicates with the communication terminal 200 by Bluetooth.

The analog display 340 displays the time with needles and a dial face as shown in FIG. 1. The digital display 350 comprises an LCD and the like, and displays information such as the time. The operator 360 receives an operation to start the module ID transmission procedure.

The product serial registration procedure executed by the server 100 having the above configuration will be described next. The product serial registration procedure is a procedure to register in the server 100 the module ID and the product serial S of the electronic watch 300 that has passed quality inspection.

Figure 6:
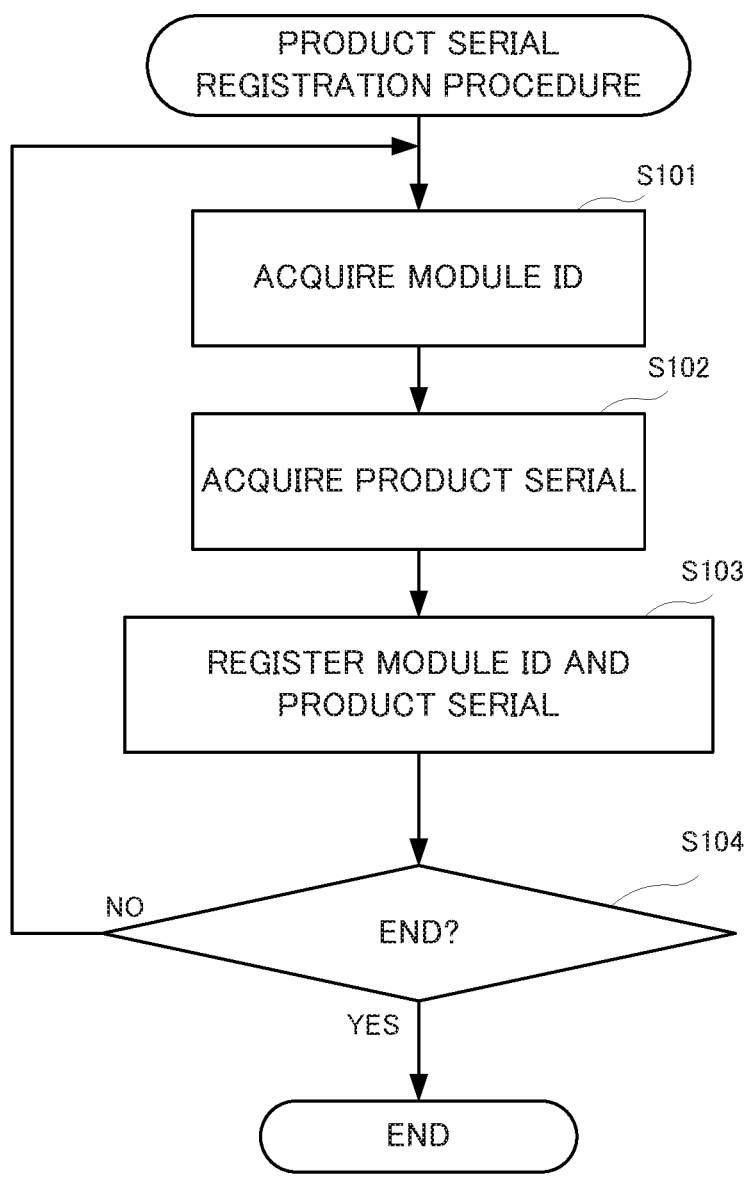
FIG. 6 is a flowchart showing the product serial registration procedure executed by the server according to Embodiment 1 of the present disclosure.

In response to an order to start the procedure by the administrator, the server 100 starts the product serial registration procedure shown in FIG. 6. The product serial registration procedure executed by the server 100 will be described below using the flowchart.

First, the product serial registrator 111 acquires the module ID stored in the memory 320 of the electronic watch 300 (Step S101). For example, the product serial registrator 111 receives data presenting the module ID via a communication device communicably connected to the electronic watch 300. Next, the product serial registrator 111 acquires data presenting the product serial S engraved on the back cover of the electronic watch 300 (Step S102). For example, the product serial registrator 111 acquires data presenting the product serial S by converting an image of the product serial S engraved on back cover that is captured by a not-shown imaging device or the like to character data by OCR.

Next, the product serial registrator 111 associates and registers (stores) the module ID and the product serial S in the module ID table stored in the memory 140 and shown in FIG. 3 (Step S103). Next, the product serial registrator 111 determines whether an order to end the product serial registration procedure is entered into the inputter 120 of the server 100 (Step S104). If determined that the end order is not entered (Step S104: No), the Steps S101 to S103 are repeated to register the module IDs and the product serials S corresponding to all electronic watches 300 manufactured. If determined that the end order is entered (Step S104: Yes), the product serial registrator 111 ends the product serial registration procedure.

The module ID transmission procedure shown in FIG. 7 and executed by the electronic watch 300, the certificate display procedure shown in FIG. 8 and executed by the communication terminal 200, and the product serial transmission procedure shown in FIG. 9 and executed by the server 100 having the above-described configurations will be described next. These procedures are the procedures to display a certificate of the electronic watch 300 on the display 240 of the communication terminal 200.

Figure 7:
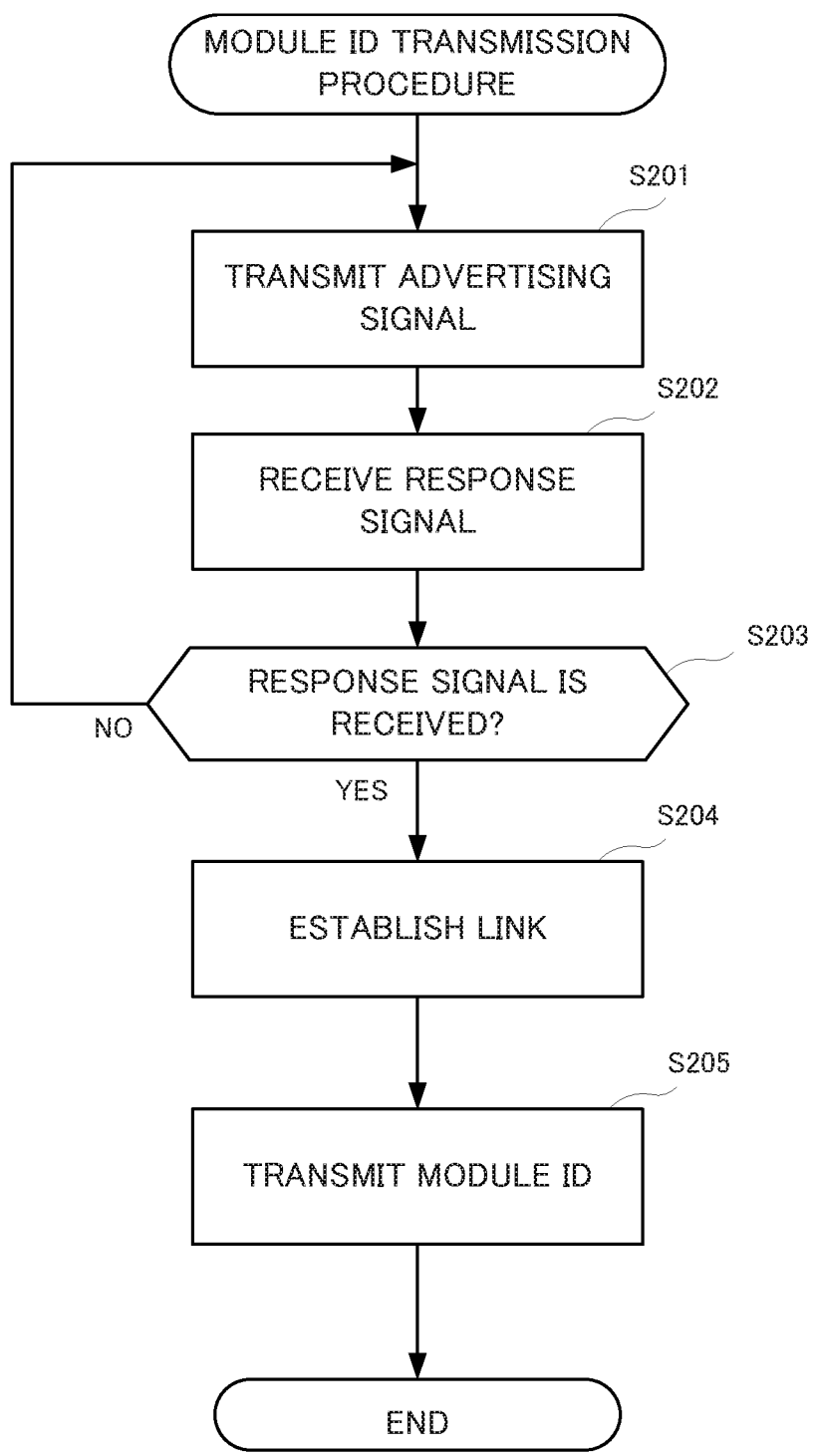
FIG. 7 is a flowchart showing the module ID transmission procedure executed by the electronic device according to Embodiment 1 of the present disclosure.

In response to an order to start the procedure by the user, the electronic watch 300 starts the module ID transmission procedure shown in FIG. 7. Moreover, in response to an order to start the procedure by the user, the communication terminal 200 starts the certificate display procedure shown in FIG. 8. In response to an order to start the procedure by the administrator, the server 100 starts the product serial transmission procedure shown in FIG. 9. Here, once starting the procedure, the server 100 constantly executes the product serial transmission procedure from then on.

First, as the electronic watch 300 starts the module ID transmission procedure shown in FIG. 7, the pairer 313 of the electronic watch 300 transmits an advertising signal via the communicator 330 (Step S201). Next, the pairer 313 receives a response signal (Step S202). Next, the pairer 313 determines whether a response signal transmitted by the communication terminal 200 is received (Step S203). If determined that no response signal is received (Step S203: No), the pairer 313 repeats the processing of the Steps S201 and S202.

Next, if determined that a response signal transmitted by the communication terminal 200 is received (Step S203: Yes), the pairer 313 establishes a link to the communication terminal 200 (Step S204).

Subsequently, the module ID transmitter 311 of the electronic watch 300 transmits data of the module ID stored in the memory 320 to the communication terminal 200 via the communicator 330 (Step S205). Then, the module ID transmission procedure ends.

Figure 8:
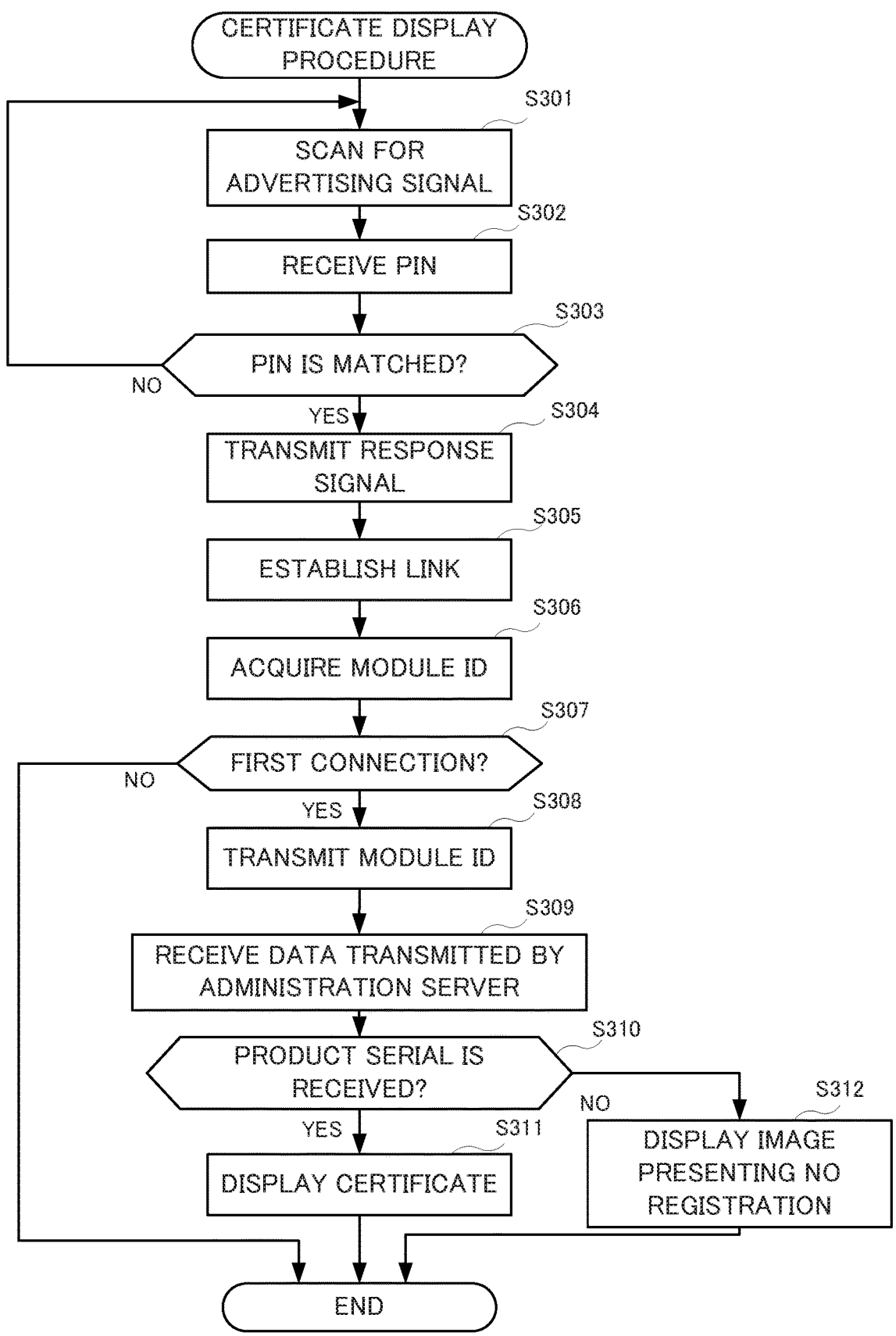
FIG. 8 is a flowchart showing the certificate display procedure executed by the communication terminal according to Embodiment 1 of the present disclosure.

On the other hand, as the communication terminal 200 starts the certificate display procedure shown in FIG. 8, the pairer 215 of the communication terminal 200 scans for an advertising signal (Step S301). If the pairer 215 receives an advertising signal, the pairer 215 receives a PIN entered by the user (step S302). Next, the pairer 215 of the communication terminal 200 determines whether the entered PIN and the PIN registered in the electronic watch 300 match (Step S303). If determined that they do not match (Step S303: No), the processing returns to the Step S301. If determined that they match (Step S303: Yes), the pairer 215 transmits a response signal via the communicator 220 (Step S304).

Next, the pairer 215 of the communication terminal 200 establishes a link to the electronic watch 300 (Step S305). As a result, the electronic watch 300 becomes mutually communicable with the communication terminal 200.

Next, the module ID acquirer 211 of the communication terminal 200 acquires the module ID data transmitted by the electronic watch 300 via the communicator 220 (Step S306: FIG. 8). The module ID acquirer 211 saves the module ID data in the memory 230. Next, the module ID transmitter 212 determines whether the connection to the electronic watch 300 is the first connection (Step S307). The connection is determined to be not the first connection when the module ID is saved in the memory 230 and the connection is determined to be the first connection when the module ID is not saved in the memory 230. If determined to be not the first connection (Step S307: No), the certificate display procedure ends.

If determined to be the first connection (Step S307: Yes), the module ID transmitter 212 transmits the module ID data to the server 100 via the communicator 220 (Step S308).

Next, the product serial receiver 213 of the communication terminal 200 receives data of the product serial S or data presenting no registration transmitted by the server 100 (Step S309). Then, the certificate image generator 214 of the communication terminal 200 determines whether data of the product serial S are received (Step S310). If determined that data of the product serial S are not received (data presenting no registration are received) (Step S310: No), the certificate image generator 214 generates an image including information presenting no registration of the module ID and displays the image on the display 240 (Step S312: FIG. 8). Then, the certificate display procedure ends.

Figure 10:
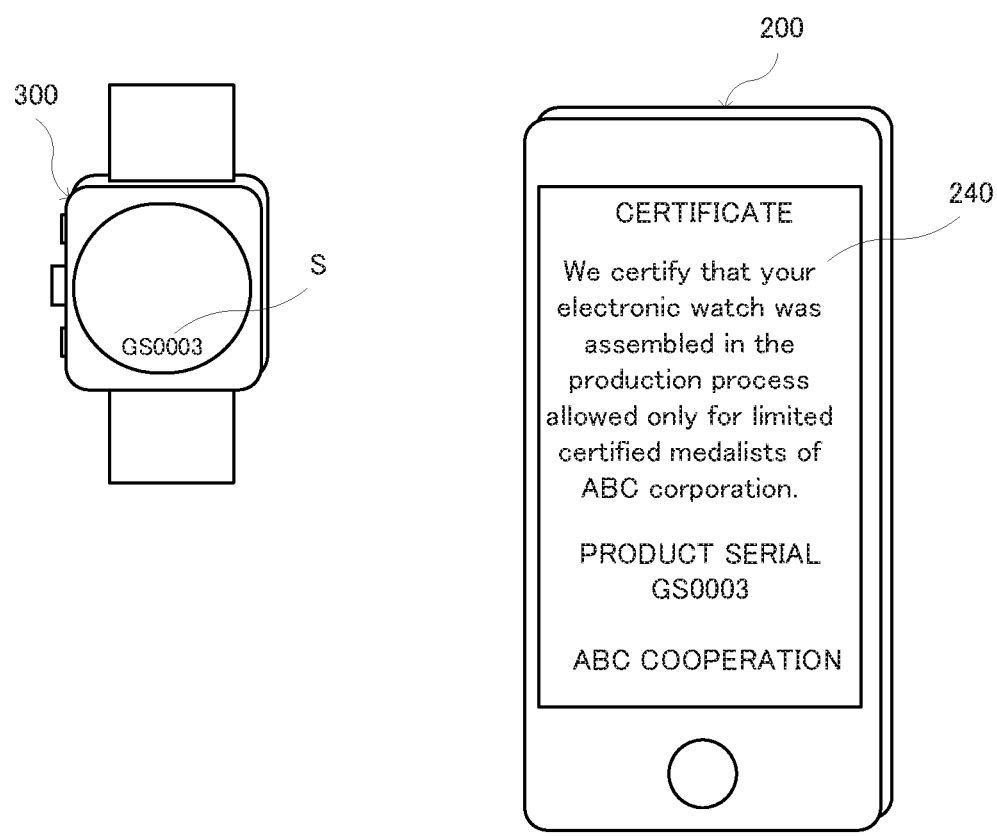
FIG. 10 is an illustration showing display of the electronic watch and the communication terminal according to Embodiment 1 of the present disclosure.

On the other hand, if determined that data of the product serial S are received (Step S310: Yes: FIG. 8), the certificate image generator 214 combines the product serial S with certificate image data presaved in the memory 230 to generate a certificate image including the product serial S (Step S311: FIG. 8). The certificate image generator 214 displays the certificate image including the product serial S on the display 240 as shown in FIG. 10. In this example, the product serial S displayed on the display 240 is "GS0003" and the product serial S engraved on the back cover of the electronic watch 300 is also "GS0003."

Figure 9:
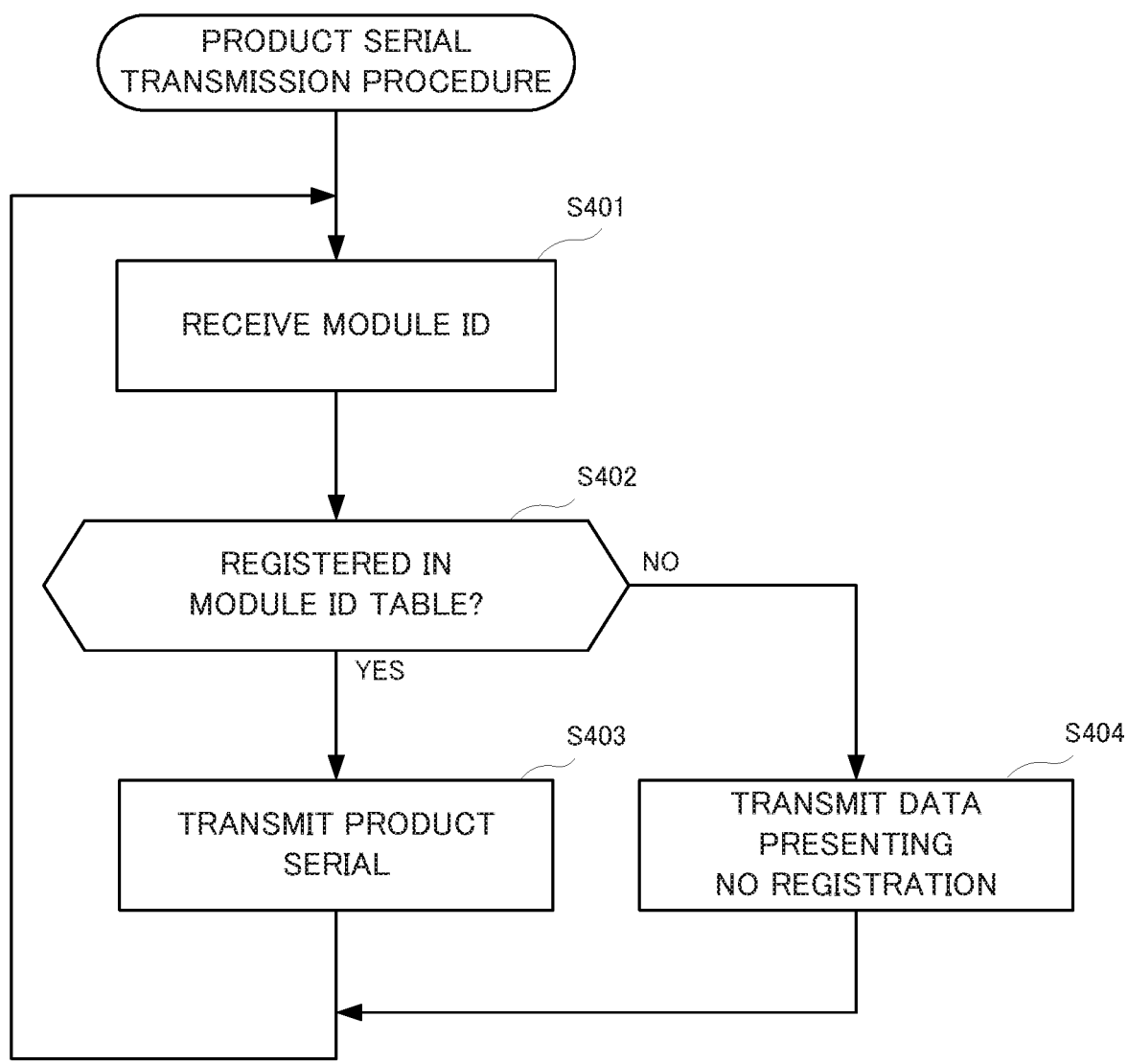
FIG. 9 is a flowchart showing the product serial transmission procedure executed by the server according to Embodiment 1 of the present disclosure.

On the other hand, as the communication terminal 200 transmits module ID data to the server 100, the module ID receiver 112 of the server 100 receives the module ID data as shown in FIG. 9 (Step S401). Next, the determiner 113 of the server 100 determines whether the module ID is registered in the module ID table (Step S402).

If the determiner 113 determines that the module ID is registered in the module ID table (Step S402: Yes), the product serial transmitter 114 transmits data of the product serial S associated with the module ID stored in the memory 140 that is equal in value to the received module ID (Step S403). For example, if the module ID is "PL203120125," the product serial transmitter 114 transmits data of "GS0003" as data of the product serial S with reference to the module ID table shown in FIG. 3. On the other hand, if the determiner 113 determines that the module ID is not registered in the module ID table (Step S402: No), the product serial transmitter 114 transmits data presenting no registration (Step S404). Subsequently, returning to the processing of the Step S401, the server 100 waits until a next module ID is transmitted.

As described above, the certificate display system 1 of Embodiment 1 can display a certificate including the product serial S of the electronic watch 300 on the display 240 of the communication terminal 200, whereby the user can compare the product serial S in the certificate displayed on the display 240 and the product serial S engraved on the back cover of the electronic watch 300 and if they are the same, confirm that the product is a genuine one. As a result, it is possible to make the user more reassured of the electronic watch 300. Even if an electronic watch has a product serial S engraved and has an exterior carefully imitated, it is difficult to copy the module ID. Moreover, the correspondence between the module ID and the product serial S is stored only in the module ID table of the server 100, whereby it is further difficult to generate an electronic watch imitating a module ID and a product serial S corresponding to each other. Moreover, the certificate display system 1 displays a certificate when the communication terminal 200 and the electronic watch 300 are paired, whereby the user is not required a complex operation.

Thus, the certificate display system 1 of Embodiment 1 prevents circulation of electronic watches imitating only the exterior.

Embodiment 2

The above certificate display system 1 of Embodiment 1 is described in regard to an exemplary case in which a certificate image is displayed on the display 240 of the communication terminal 200. In Embodiment 2, a case in which a warranty including information of a warranty expiration date (a second date) is displayed on the display 240 in addition to a certificate is described.

Figure 11:
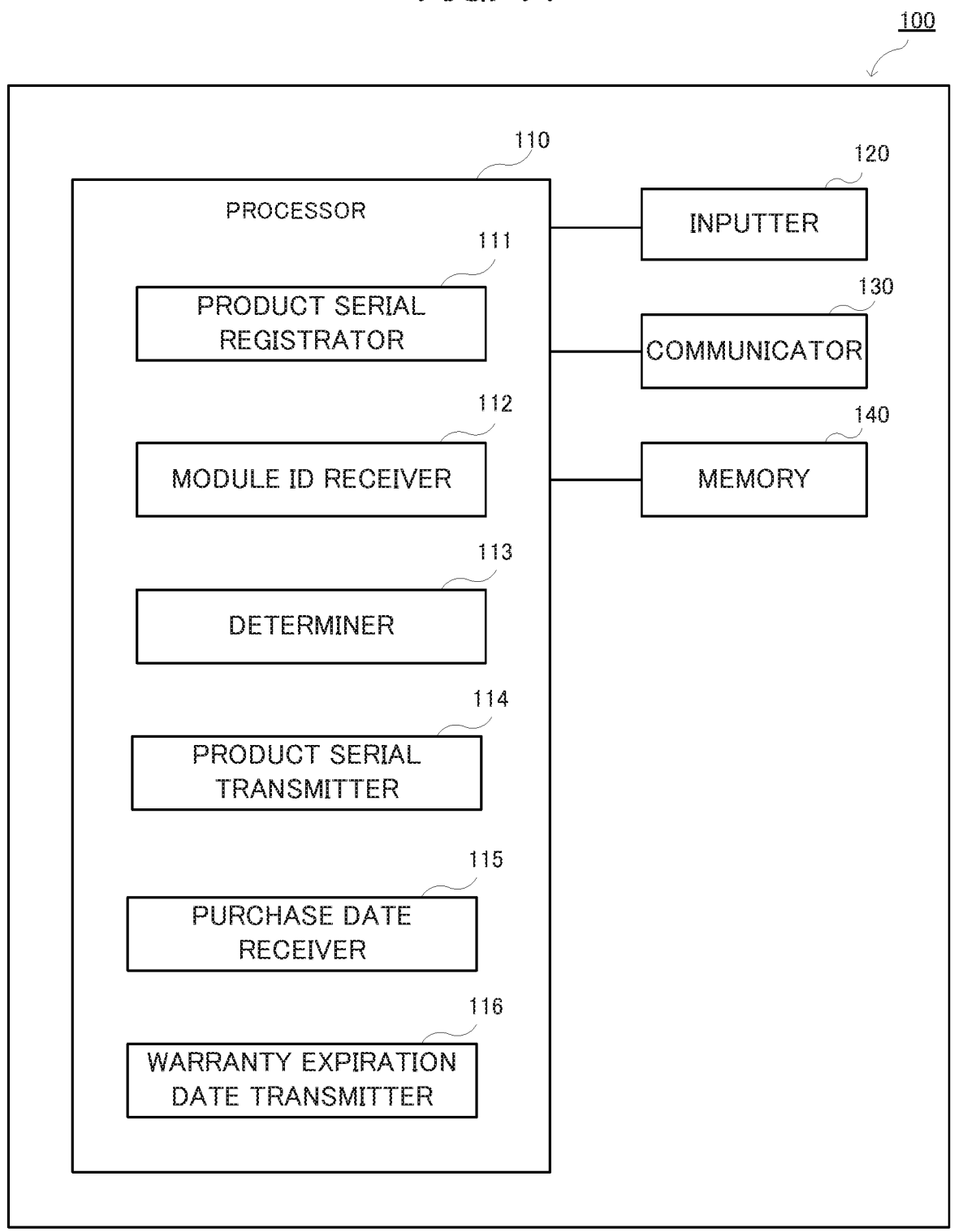
FIG. 11 is a block diagram showing the configuration of the server according to Embodiment 2 of the present disclosure.

The processor 110 of the server 100 of Embodiment 2 functions as a purchase date receiver 115 and a warranty expiration date transmitter 116 as shown in FIG. 11 in addition to the functions of the processor 110 of server 100 of Embodiment 1 shown in FIG. 2. The other configuration of the server 100 of Embodiment 2 is the same as in Embodiment 1.

The purchase date receiver 115 receives data presenting a first pairing date (a given date, a first date) transmitted by the communication terminal 200 via the communicator 130, and saves the data presenting a first pairing date in the module ID table shown in FIG. 12. Here, the first pairing date is acknowledged as the purchase date and set as the start date of a warranty period (a given period).

The warranty expiration date transmitter 116 calculates a warranty expiration date by adding a warranty period presaved in the module ID table to the first pairing date received by the purchase date receiver 115 and transmits the warranty expiration date to the communication terminal 200 via the communicator 130.

Figure 13:
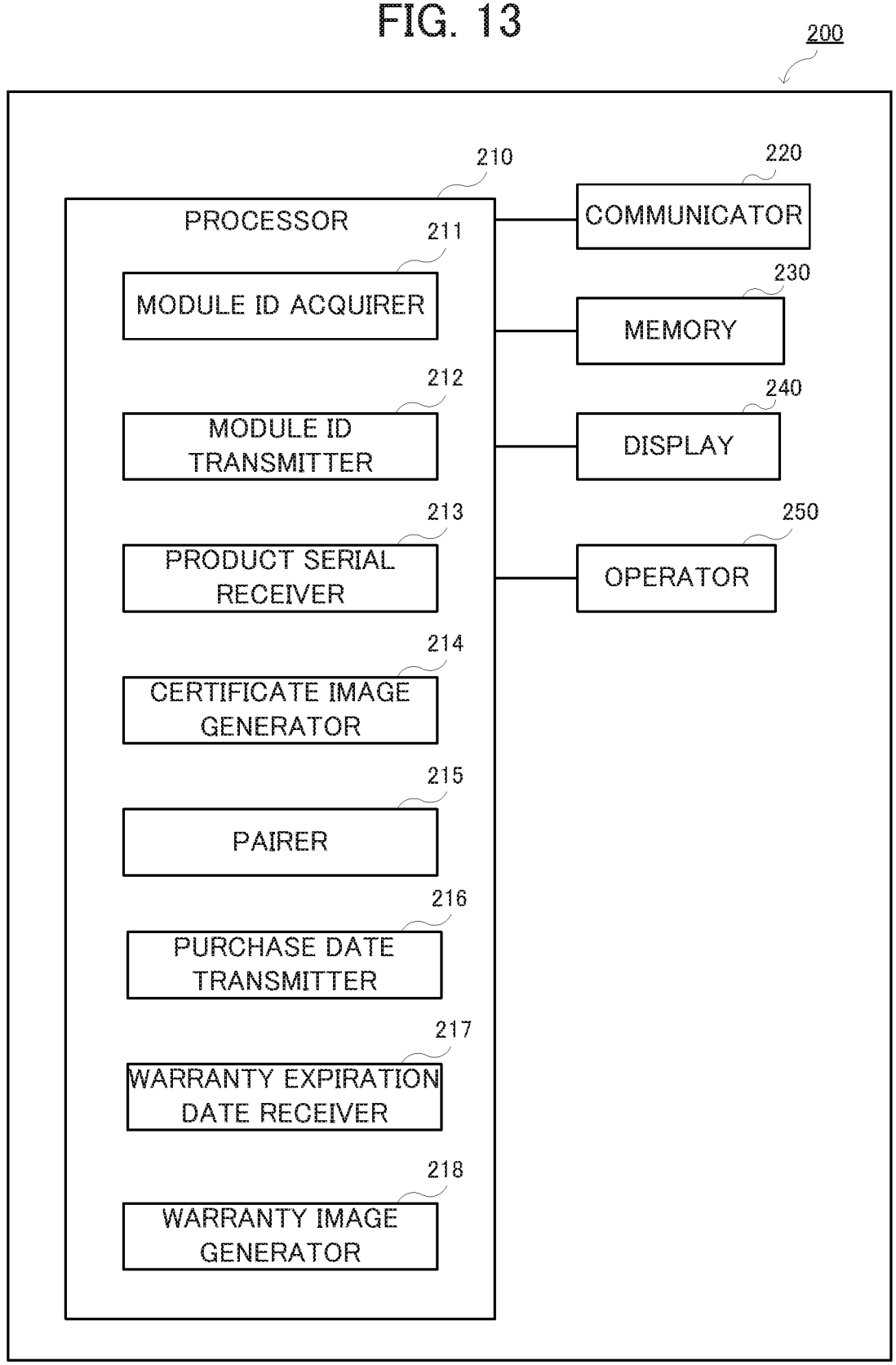
FIG. 13 is a block diagram showing the configuration of the communication terminal according to Embodiment 2 of the present disclosure.

The processor 210 of the communication terminal 200 of Embodiment 2 functions as a purchase date transmitter 216, a warranty expiration date receiver 217, and a warranty image generator 218 as shown in FIG. 13 in addition to the functions of the processor 210 of the communication terminal 200 of Embodiment 1 shown in FIG. 4. The other configuration of the communication terminal 200 of Embodiment 2 is the same as in Embodiment 1.

The purchase date transmitter 216 acknowledges the first pairing date as the purchase date and saves data presenting the first pairing date in the memory 230 of the communication terminal 200. Moreover, the purchase date transmitter 216 transmits data presenting the first pairing date to the server 100 via the communicator 220.

The warranty expiration date receiver 217 receives and saves in the memory 230 data presenting the warranty expiration date transmitted by the server 100.

As the warranty expiration date receiver 217 receives data presenting the warranty expiration date, the warranty image generator 218 combines the warranty expiration date with warranty image data (basic data) presaved in the memory 230 to generate a warranty image including the warranty expiration date (display data), saves the image in the memory 230, and displays the image on the display 240.

The electronic watch 300 of the Embodiment 2 has the same configuration as the electronic watch 300 of Embodiment 1.

The warranty/certificate display procedure executed by the communication terminal 200 and the warranty expiration date/product serial transmission procedure executed by the server 100 having the above-described configurations will be described next. The warranty/certificate display procedure is the same as the warranty/certificate display procedure of Embodiment 1 up to the module ID transmission in the Step S308. The warranty/certificate display procedure after the Step S307 will be described with reference to FIG. 14 and the warranty expiration date/product serial transmission procedure will be described with reference to FIG. 15.

Figure 14:
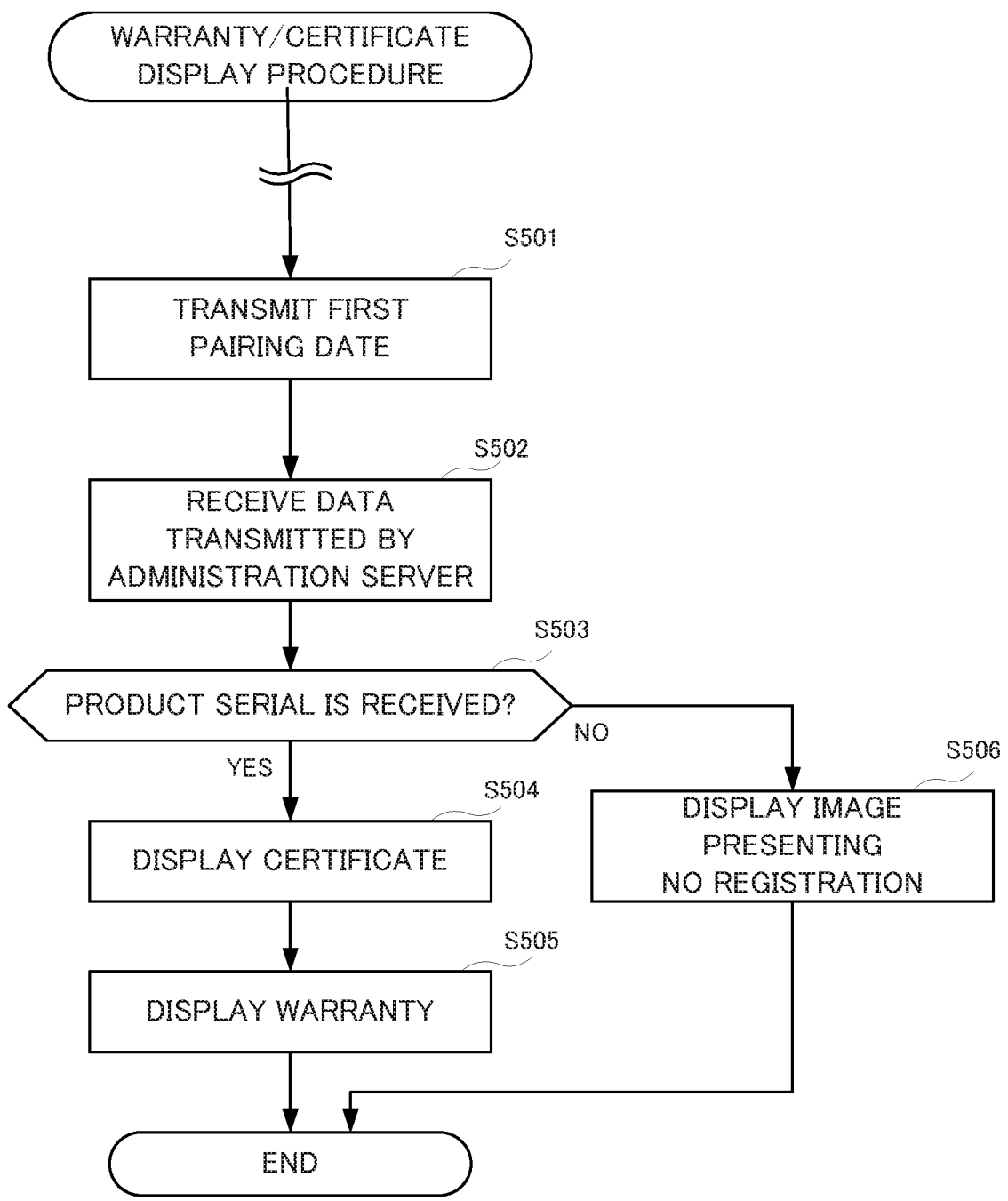
FIG. 14 is a flowchart showing the warranty/certificate display procedure executed by the communication terminal according to Embodiment 2 of the present disclosure.
Figure 15:
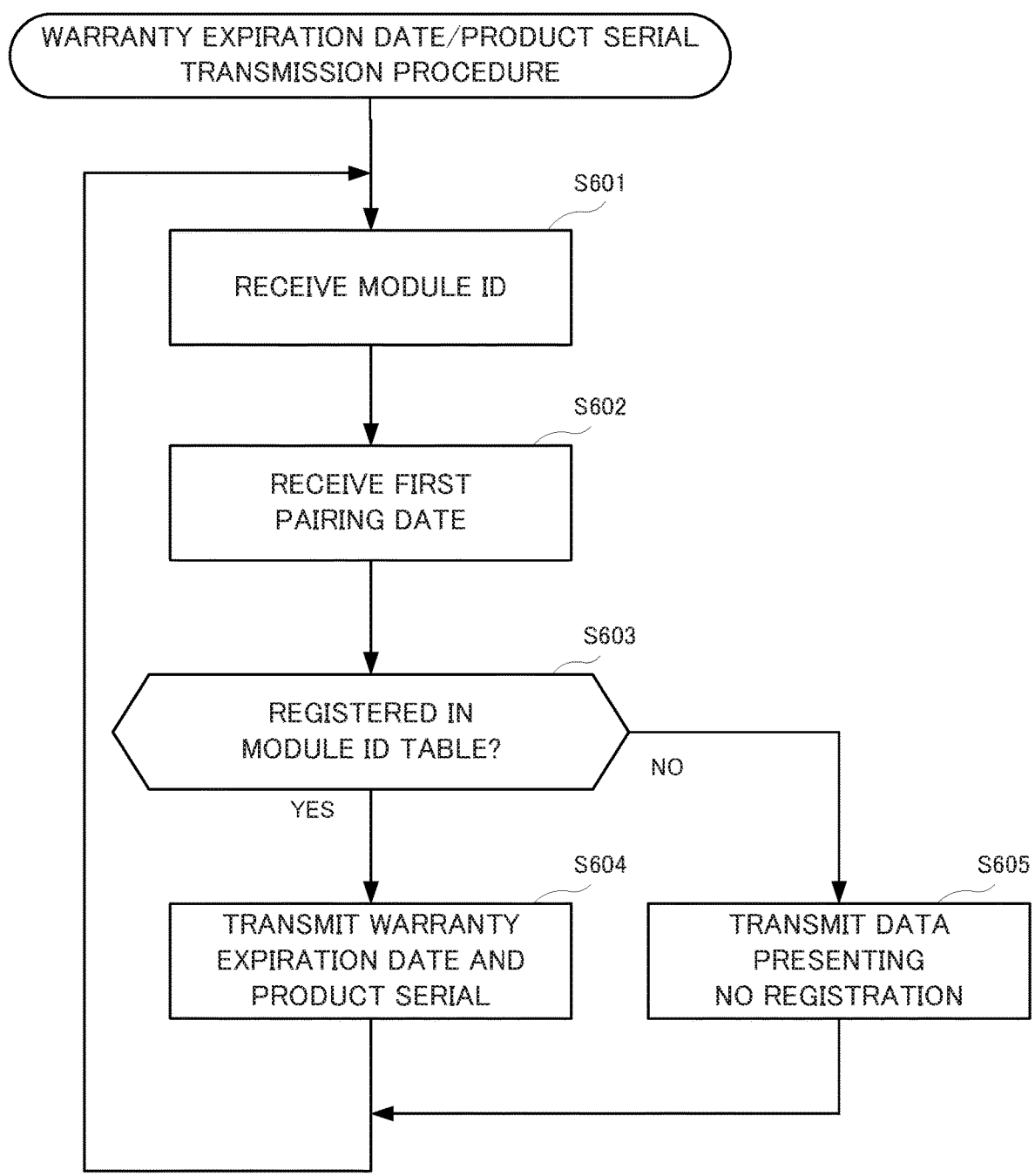
FIG. 15 is a flowchart showing the warranty expiration date/product serial transmission procedure executed by the server according to Embodiment 2 of the present disclosure.

In the certificate display procedure shown in FIG. 8, as the module ID transmitter 212 of the communication terminal 200 implements the module ID transmission to transmit data of the module ID to the server 100, next, the purchase date transmitter 216 saves data presenting the first pairing date in the memory 230 of the communication terminal 200 and transmits the data presenting the first pairing date to the server 100 via the communicator 220 as shown in FIG. 14 (Step S501).

Next, the product serial receiver 213 of the communion terminal 200 receives data presenting the product serial S or data presenting no registration transmitted by the server 100 and the warranty expiration date receiver 217 receives data presenting the warranty expiration date (Step S502). Next, the certificate image generator 214 of the communication terminal 200 determines whether data presenting the product serial S are received (Step S503). If determined that data presenting the product serial S are not received (Step S503: No), the certificate image generator 214 generates an image including information presenting no registration of the module ID and displays the image on the display 240 (Step S506). Then, the warranty/certificate display procedure ends.

Figure 16:
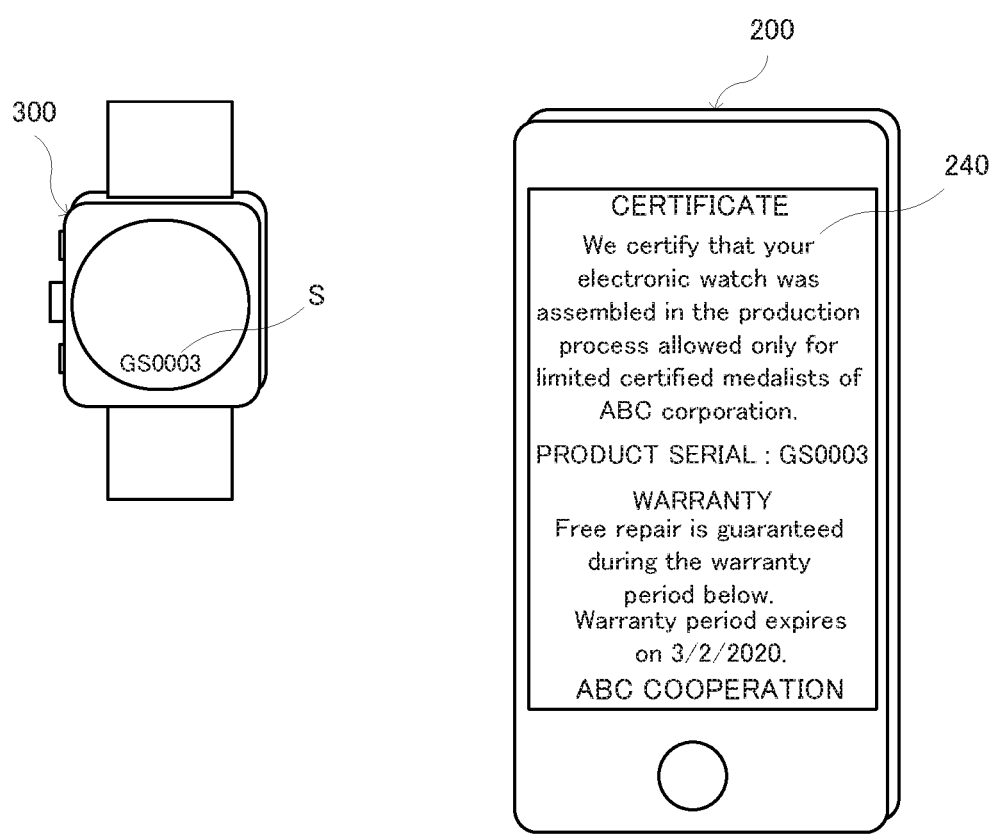
FIG. 16 is an illustration showing display of the electronic watch and the communication terminal according to Embodiment 2 of the present disclosure.

On the other hand, if determined that data presenting the product serial S are received (Step S503: Yes), the certificate image generator 214 combines the product serial S with certificate image data presaved in the memory 230 to generate a certification image including the product serial S (Step S504). Next, the warranty image generator 218 combines the warranty expiration date with warranty image data presaved in the memory 230 to generate a warranty image including the warranty expiration date (Step S505). The certificate image generator 214 and the warranty image generator 218 display the certificate image including the product serial S and the warranty image including the warranty expiration date on the display 240 as shown in FIG. 16. In this example, the product serial S displayed on the display 240 is "GS0003" and the product serial S engraved on the back cover of the electronic watch 300 is also "GS0003." The warranty expiration date is Mar. 2, 2020.

On the other hand, as the communication terminal 200 transmits data of the module ID and the first pairing date to the server 100, the module ID receiver 112 of the server 100 receives the data of the module ID (Step S601). Then, the purchase date receiver 115 receives data presenting the first pairing date transmitted by the communication terminal 200 and saves the data presenting the first pairing date in the module ID table shown in FIG. 12 (Step S602). Next, the determiner 113 determines whether the module ID is registered in the module ID table (Step S603).

If the determiner 113 determines that the module ID is registered in the module ID table (Step S603: Yes), the product serial transmitter 114 transmits data of the product serial S associated with the received module ID. Then, the warranty expiration date transmitter 116 calculates a warranty expiration date by adding the number of years of warranty presaved in the module ID table to the first pairing date received by the purchase date receiver 115 and transmits the warranty expiration date to the communication terminal 200 via the communicator 130 (Step S604). For example, if the module ID is "PL203120125," the product serial transmitter 114 transmits data presenting the product serial S of "GS0003" with reference to the module ID table shown in FIG. 12. If the first pairing date is Mar. 2, 2017, the product serial transmitter 114 calculates a warranty expiration date (Mar. 2, 2020) by adding the number of years of warranty (three years) presaved in the module ID table, and transmits the warranty expiration date.

On the other hand, if the determiner 113 determines that the module ID is not registered in the module ID table (Step S603: No), the product serial transmitter 114 transmits data presenting no registration (Step S605). Subsequently, returning to the Step S601, the server 100 waits until a next module ID is transmitted.

As described above, the certificate display system 1 of Embodiment 2 can display a certificate including the product serial S and a warranty including the warranty expiration date of the electronic watch 300 on the display 240 of the communication terminal 200. Therefore, it is possible to eliminate the processing of including a warranty printed on paper in the package. Moreover, since an image presenting the warranty is saved in the memory 230, when the warranty has to be presented, the user can display and present the saved image even if the electronic watch 300 is broken.

Modified Embodiments

In the above embodiments, a case is described in which the product serial S is displayed in a certificate displayed on the display 240 of the communication terminal 200. However, in addition to the product serial S, information such as the manufacturing plant, the production personnel, and the manufacturing date may be added in the certificate.

In the above embodiments, an exemplary case is described in which a certificate or a warranty is displayed on the display 240 of the communication terminal 200. However, a certificate or a warranty may be displayed on the digital display 350 of the electronic watch 300. For example, the electronic watch 300 may acquire data presenting the product serial S and the warranty expiration date via the communication terminal 200 and display on the digital display 350 an image of a certificate in which the product serial S is combined or a warranty in which the product serial S and the warranty expiration date are combined. In such a case, it is preferable that the digital display 350 comprises an LCD displaying high resolution images.

In the above embodiments, a case is described by way of example in which the product serial S is engraved on the back cover of the electronic watch 300. However, the product serial S has only to be indicated somewhere the user can view the product serial S. For example, the product serial S may be indicated on the dial face or displayed on the digital display 350.

In the above embodiments, an exemplary case is described in which the processor 310 and the memory 320 constitute the module of the electronic watch 300. However, the module may include the communicator 330 or some other configuration.

In the above embodiments, a case is described by way of example in which the communication terminal 200 and the electronic watch 300 mutually communicate by Bluetooth. However, the scope of the present disclosure is not confined thereto. The communication terminal 200 and the electronic watch 300 may mutually communicate by electric waves, infrared light, ultraviolet light, or ultrasonic waves other than Bluetooth.

In the above embodiments, the server 100 and the communication terminal 200 mutually communicate via an Internet line. However, the scope of the present disclosure is not confined thereto. The server 100 and the communication terminal 200 may mutually communicate by a telephone line, wireless communication, or wired communication.

In the above embodiments, an exemplary case is described in which the first unique number comprises a module ID stored in the memory 320 of the electronic watch 300 and the second unique number comprises a product serial S displayed on the electronic watch 300. However, the first unique number and the second unique number have only to be those given to the electronic watch 300 and the scope of the present disclosure is not restricted to these. For example, it may be possible that the first unique number comprises a product serial S displayed on the electronic watch 300 and the second unique number comprises a module ID stored in the memory 320 of the electronic watch 300. In such a case, for example, the communication terminal 200 acquires data presenting a product serial S obtained by converting a captured image of the product serial S to character data by OCR and transmits the data presenting the product serial S to the server 100. The server 100 having received the data presenting the product serial S transmits data of a module ID corresponding to the product serial S to the communication terminal 200. The certificate image generator 214 of the communication terminal 200 having received the data of the module ID combines the module ID with presaved certificate image data to generate a certificate image including the module ID, and displays the certificate image on the display 240 of the communication terminal 200. In response to user operation, the electronic watch 300 displays the module ID on the digital display 350. Comparing with the module ID in the certificate displayed on the display 240, the user can confirm that the product is a genuine one if they are the same.

In the above Embodiment 2, an exemplary case is described in which the first pairing date is acknowledged as the purchase date and set as the start date of a warranty period (a given period). However, acknowledgment of the purchase date is not restricted to this example. For example, it may be possible that information of the purchase date is acquired from the user or the store that sold the product, the purchase date receiver 115 receives the information of the purchase date via the inputter 120, and the purchase date is saved in the module ID table shown in FIG. 12 and set as the start date of a warranty period. In such a case, the warranty image may include store information such as the store's address, name, and telephone number and user information such as the user's name, address, and telephone number.

In the above embodiments, an exemplary case is described in which the second electronic device comprises the electronic watch 300. However, the second electronic device has only to be capable of storing data of the module ID in the memory 320 within the module and transmitting the stored data of the module ID to the communication terminal 200, and the scope of the present disclosure is not restricted thereto. For example, the second electronic device may comprise an input device such as a mouse, a digital camera, a headphone, or the like.

Moreover, the part comprising a CPU, a RAM, a ROM, and the like and playing a central role in implementing the certificate display procedure and the warranty/certificate display procedure executed by the communication terminal 200 can be realized by a conventional portable information terminal (a smartphone or a table PC), a personal computer, or the like, not by a dedicated system. For example, an information terminal executing the above-described procedures may be configured by saving and distributing a computer program for executing the above operation on a non-transitory computer-readable recording medium (a flexible disc, a compact disc read only memory (CD-ROM), a digital versatile disc read only memory (DVD-ROM), or the like) and installing the computer program on a portable information terminal. Moreover, an information processing device may be configured by saving the computer program in a storage device of a server unit on a communication network such as the Internet and allowing a conventional information processing terminal to download the computer program.

Moreover, when the function of the communication terminal 200 is realized by apportionment between an operating system (OS) and an application program or cooperation of an OS and an application program, only the application program part may be saved in a non-transitory recording medium or a storage device.

Moreover, the computer program can be superimposed on carrier waves and distributed via a communication network. For example, the computer program may be posted on a bulletin board system (BBS) of a communication network and distributed via the network. Then, the computer program may be activated and executed in a similar manner to other application programs under the control of an OS so that the above-described procedures are executed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A data transmission method executed by a server comprising a processor device and a communication interface, the data transmission method comprising:
    accessing, by the processor device, a memory that stores:
        first unique number data presenting a first unique number;
        second unique number data presenting a second unique number; and
        given period data presenting a given period,
        wherein the first unique number data, the second unique number data and the given period data are stored in the memory in association with each other;
    performing a first unique number reception step of the processor device controlling the communication interface to receive first unique number data presenting a first unique number from a first electronic device;
    performing a data reception step of the processor device controlling the communication interface to receive given date data presenting a given date from the first electronic device, wherein the given date is a date on which the first electronic device and a second electronic device were paired for a first time;
    performing a determination step of the processor device determining whether the first unique number presented by the first unique number data received in the first unique number reception step matches the first unique number presented by the first unique number data stored in the memory; and
    in response to determining, in the determination step, that the first unique number presented in the first unique number data received in the first unique number reception step matches the first unique number presented by the first unique number data stored in the memory,
        performing a second unique number transmission step of the processor device controlling the communication interface to transmit, to the first electronic device, the second unique number data stored in association with the first unique number data stored in the memory, to be displayed by the first electronic device;
        obtaining a date by adding the given period presented by the given period data stored in the memory to the given date presented by the given date data received in the date reception step; and
        performing a data transmission step of the processor device controlling the communication interface to transmit, to the first electronic device, data presenting the date obtained by adding the given period presented by the given period data stored in the memory to the given date presented by the given date data received in the date reception step, to be displayed by the first electronic device.

2. The data transmission method according to claim 1, wherein in the first unique number reception step, the first unique number data presenting the first unique number is stored in a second electronic device, acquired by the first electronic device, and received from the first electronic device.

3. The data transmission method according to claim 1, wherein the first unique number and the second unique number are numbers for identifying the second electronic device.

4. The data transmission method according to claim 1, wherein the given date is a date of the second electronic device being purchased.

5. The data transmission method according to claim 1, wherein the first unique number data received in the first unique number reception step is stored in a memory of the second electronic device, and acquired by the first electronic device during communication operation for pairing with the second electronic device.

6. A display system comprising:
    a first electronic device; and
    a server comprising:
        a communication interface; and
        a processor device configured to:
        access a memory that stores:
            first unique number data presenting a first unique number;
            second unique number data presenting a second unique number; and
            given period data presenting a given period,
            wherein the first unique number data, the second unique number data and the given period data are stored in the memory in association with each other;
        perform a first unique number reception step of controlling the communication interface to receive first unique number data presenting a first unique number from a first electronic device;
        perform a data reception step of controlling the communication interface to receive given date data presenting a given date from the first electronic device, wherein the given date is a date on which the first electronic device and a second electronic device were paired for a first time;

perform a determination step of determining whether the first unique number presented by the first unique number data received by the communicator matches the first unique number presented by the first unique number data stored in the memory; and in response to determining, in the determination step, that the first unique number presented in the first unique number data received in the first unique number reception step matches the first unique number presented by the first unique number data stored in the memory, perform a second unique number transmission step of controlling the communication interface to transmit, to the first electronic device, the second unique number data stored in association with the first unique number data stored in the memory;

obtain a date by adding the given period presented by the given period data stored in the memory to the given date presented by the given date data received in the date reception step; and perform a data transmission step of controlling the communication interface to transmit, to the first electronic device, data presenting the date obtained by adding the given period presented by the given period data stored in the memory to the given date presented by the given date data received in the date reception step; and wherein the first electronic device is configured to generate display data that include the second unique number data and the data presenting the date obtained by adding the given period presented by the given period data stored in the memory to the given date presented by the given data received in the date reception step.

7. A server comprising:

a communication interface; and a processor device configured to:

access a memory that stores:

first unique number data presenting a first unique number;

second unique number data presenting a second unique number; and given period data presenting a given period, wherein the first unique number data, the second unique number data and the given period data are stored in the memory in association with each other;

perform a first unique number reception step of controlling the communication interface to receive first unique number data presenting a first unique number from a first electronic device;

perform a data reception step of controlling the communication interface to receive given date data presenting a given date from the first electronic device, wherein the given date is a date on which the first electronic device and a second electronic device were paired for a first time;

perform a determination step of determining whether the first unique number presented by the first unique number data received by the communicator matches the first unique number presented by the first unique number data stored in the memory; and in response to determining, in the determination step, that the first unique number presented in the first unique number data received in the first unique number reception step matches the first unique number presented by the first unique number data stored in the memory, perform a second unique number transmission step of controlling the communication interface to transmit, to the first electronic device, the second unique number data stored in association with the first unique number data stored in the memory, to be displayed by the first electronic device;

obtain a date by adding the given period presented by the given period data stored in the memory to the given date presented by the given date data received in the date reception step; and perform a data transmission step of controlling the communication interface to transmit, to the first electronic device, data presenting the date obtained by adding the given period presented by the given period data stored in the memory to the given date presented by the given date data received in the date reception step, to be displayed by the first electronic device.

* * * * *